US011266991B2

United States Patent
Bornmann et al.

(10) Patent No.: US 11,266,991 B2
(45) Date of Patent: Mar. 8, 2022

(54) DEVICE FOR INSERTION INTO AN IMAGING SYSTEM

(71) Applicant: ALS Automated Lab Solutions GmbH, Jena (DE)

(72) Inventors: Gerd Bornmann, Weimar (DE); Jens Eberhardt, Gera (DE)

(73) Assignee: ALS Automated Lab Solutions GmbH, Jena (DE)

(*) Notice: Subject to any disclaimer, the term of this patent is extended or adjusted under 35 U.S.C. 154(b) by 0 days.

(21) Appl. No.: 16/132,443

(22) Filed: Sep. 16, 2018

(65) Prior Publication Data
US 2019/0039061 A1   Feb. 7, 2019

Related U.S. Application Data

(63) Continuation of application No. PCT/DE2017/100179, filed on Mar. 7, 2017.

(30) Foreign Application Priority Data

Mar. 15, 2016 (DE) .......................... 102016104808.9

(51) Int. Cl.
*B01L 3/00* (2006.01)
*G02B 21/34* (2006.01)
(Continued)

(52) U.S. Cl.
CPC .............. *B01L 3/5088* (2013.01); *B01L 9/52* (2013.01); *G02B 21/24* (2013.01); *G02B 21/34* (2013.01); *B01L 2200/0668* (2013.01); *B01L 2300/0822* (2013.01); *B01L 2300/165* (2013.01); *B01L 2400/043* (2013.01)

(58) Field of Classification Search
CPC .... B01L 3/5088; B01L 9/52; B01L 2300/165; B01L 2400/043; B01L 2300/0822; B01L 2200/0668; G02B 21/24; G02B 21/34
See application file for complete search history.

(56) References Cited

U.S. PATENT DOCUMENTS 5,041,266 A * 8/1991 Fox ...................... B01L 3/50853
                                                              422/552
5,306,467 A * 4/1994 Douglas-Hamilton ... B01L 9/50
                                                              211/DIG. 1
(Continued)

FOREIGN PATENT DOCUMENTS

DE       7120165 U       10/1971
DE       29923907 U1      7/2001
(Continued)

OTHER PUBLICATIONS

"Biotech Sample Holders" Semprex Corporation, captured by www.archive.org on Feb. 17, 2006 (Year: 2006).*
(Continued)

*Primary Examiner* — Samuel P Siefke
*Assistant Examiner* — Quocan B Vo
(74) *Attorney, Agent, or Firm* — Walter Ottesen, P.A.

(57) ABSTRACT

The invention relates to a device for inserting into an imaging system. The device has a receptacle for a specimen carrier for a specimen. The device also includes an arrangement for producing a magnetic field in a region of the receptacle for the specimen carrier.

16 Claims, 6 Drawing Sheets

(51) Int. Cl.
  *B01L 9/00* (2006.01)
  *G02B 21/24* (2006.01)

(56) References Cited

U.S. PATENT DOCUMENTS

| | | | | |
|---|---|---|---|---|
| 5,885,527 | A * | 3/1999 | Buechler | B01J 19/0093 |
| | | | | 422/412 |
| 5,958,345 | A | 9/1999 | Turner et al. | |
| 5,985,153 | A * | 11/1999 | Dolan | B01L 3/502 |
| | | | | 209/214 |
| 6,013,532 | A * | 1/2000 | Liberti | B03C 1/002 |
| | | | | 435/7.9 |
| 6,037,168 | A * | 3/2000 | Brown | B01L 3/50853 |
| | | | | 435/288.3 |
| 7,011,794 | B2 * | 3/2006 | Kagan | B01L 3/508 |
| | | | | 356/244 |
| 7,585,469 | B2 | 9/2009 | Zimmermann | |
| 8,189,899 | B2 * | 5/2012 | Coumans | G01N 15/1475 |
| | | | | 382/128 |
| 9,174,216 | B2 * | 11/2015 | Handique | G01N 35/0098 |
| 9,656,271 | B2 * | 5/2017 | Zhou | B03C 1/033 |
| 9,822,331 | B2 | 11/2017 | Backhaus et al. | |
| 2002/0109838 | A1 | 8/2002 | Columbus | |
| 2003/0040129 | A1 | 2/2003 | Shah | |
| 2005/0064209 | A1 * | 3/2005 | Haines | B01J 19/0046 |
| | | | | 428/447 |
| 2005/0196857 | A1 | 9/2005 | Lee | |
| 2007/0153369 | A1 | 7/2007 | Schutze et al. | |
| 2010/0255556 | A1 * | 10/2010 | Hunt | B01L 3/502761 |
| | | | | 435/173.1 |
| 2010/0285573 | A1 * | 11/2010 | Leck | B01L 3/5088 |
| | | | | 435/288.4 |
| 2015/0043061 | A1 | 2/2015 | Cho et al. | |

FOREIGN PATENT DOCUMENTS

| | | |
|---|---|---|
| FR | 2963741 A1 | 2/2012 |
| JP | H08271801 A | 10/1996 |
| JP | H0989774 A | 4/1997 |
| JP | 2010500562 A | 1/2010 |
| JP | 2013213855 A | 10/2013 |
| KR | 2003-0074816 A | 9/2003 |
| WO | 03008934 A1 | 1/2003 |
| WO | 2008/091296 A2 | 7/2008 |

OTHER PUBLICATIONS

Ino et al. "Cell culture arrays using magnetic force-based cell patterning for dynamic single cell analysis" Lab Chip, 2008, 8, 134-142 (Year: 2008).*
Yu et al. "Controlling the Magnetic Field Distribution on the Micrometer Scale and Generation of Magnetic Bead Patterns for Microfluidic Applications" Langmuir 2011, 27, 5147-5156 (Year: 2011).*
International Search Report dated Aug. 21, 2017 of international application PCT/DE2017/100179 on which this application is based.
Translation of Korean Office action dated Nov. 12, 2020 in corresponding Korean application No. 10-2018-7029048.

* cited by examiner

A--A

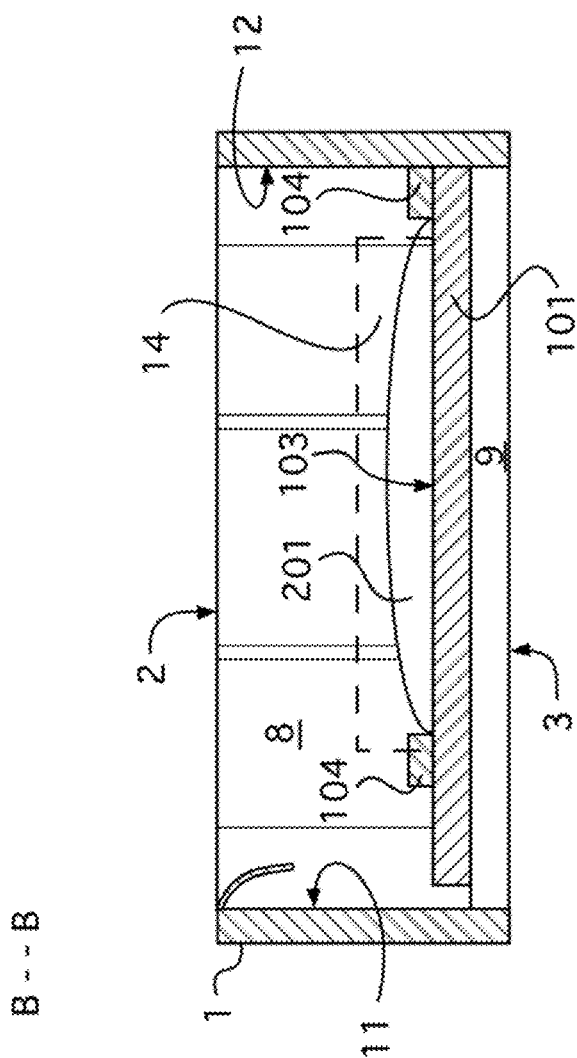

DEVICE FOR INSERTION INTO AN IMAGING SYSTEM

CROSS REFERENCE TO RELATED APPLICATIONS

This application is a continuation application of international patent application PCT/DE2017/100179, filed Mar. 7, 2017, designating the U.S. and claiming priority from German application 10 2016 104 808.9, filed Mar. 15, 2016, and the entire content of both applications is incorporated herein by reference.

FIELD OF THE INVENTION

The invention relates to a device for insertion into an imaging system, the device comprising a receiving portion or receptacle for a sample carrier. The invention also relates to a sample carrier for use with such a device, to an imaging system comprising a receptacle for such a device and to a method for looking at biological and/or chemical samples using such a device.

BACKGROUND OF THE INVENTION

U.S. Pat. No. 9,822,331 B2 discloses a device and a method for removing cells or cell colonies from a sample in a sample carrier. The device comprises a microscope having a range of optical components, in particular an arrangement consisting of deflecting prisms and a lens system for beam guidance and microscopic imaging. The microscope is coupled to an image-capturing unit, generally a CCD camera or a CCD field. An image-evaluating unit is provided to process the image information read out from the image-capturing unit. The image-evaluating unit consists of a personal computer having image-processing software that runs thereon. Furthermore, a control and storage unit is provided, which is integrated in the personal computer and the functions of which are implemented by additional software components. The control and storage unit comprises a monitor or a display. The device also contains a picking tool, which is mounted on a movement mechanism. The movement mechanism consists of a lifting column and a movement drive, which are used to move the picking tool towards the sample located on the sample carrier, to roughly adjust the picking tool and to move the removal tool on the corresponding separation station, that is, the picking points of the removed cells or cell colonies.

The microscope described in U.S. Pat. No. 9,822,331 B2 is a transmitted light microscope, which can be equipped with a fluorescence unit. A lighting is provided for this purpose. The light irradiates the sample located on the sample carrier. The sample carrier is fastened on a stage that is part of the microscope and is formed as a motorized xy stage so that the stage can be moved, together with the sample carrier, under the optical arrangement consisting of the light and the deflection prism in both the x and the y direction. In this case, the adjustment coordinates of the xy stage are transmitted to the storage and control unit or adjusted by the storage and control unit. The microscope comprises a microscope arm, which is provided with the motorized xy stage. In addition, the image-capturing unit comprising a CCD chip is mounted on the microscope and makes it possible to scan the sample on the sample carrier. In order to remove the cells or cell colonies from the sample carrier, the picking tool is lowered above the sample. The cells or cell colonies picked up are then deposited in a target vessel.

In practice, it has been found that the uptake of the cells or cell colonies could be simplified further if the cells or cell colonies were to adhere to the sample container to a greater extent. This could ensure that fast movements of the stage, for example during scanning processes, or when the picking tool is immersed in the sample, do not cause the cells or cell colonies to change position. Furthermore, it would be possible to locate cells or cell colonies later on at the coordinates determined during the scan again, in order to then subject the cells or cell colonies to more specific optical examinations, to remove them or to treat them in some other way. However, this immobilization is not allowed to be of such an extent that the cells or cell colonies can no longer be removed from the slide. Permanent immobilization must therefore be prevented. Thus, the use of a fixing agent is excluded.

SUMMARY OF THE INVENTION

An object of the invention is to eliminate the disadvantages of the prior art. In particular, a device is specified, which allows a better immobilization of a sample on a sample carrier and which can be inserted into an imaging system. Further, an improved sample carrier for use with such a device, an imaging system comprising a receptacle for such a device and a method for viewing biological and/or chemical samples using such a device is provided.

According to the invention, a device for insertion into an imaging system is provided. The device includes a receptacle for a sample carrier for a sample and an apparatus for producing a magnetic field in a region of the receptacle.

The apparatus for producing a magnetic field is referred to as the "magnetic field apparatus" in the following. The region of the receptacle, in which a magnetic field can be formed as per the invention, is referred to in the following as the "magnetic field region."

The magnetic field region in particular includes the portion of the receptacle in which the sample to be analyzed is located when the sample carrier carrying the sample is inserted into the receptacle of the device according to the invention. The portion of the receptacle in which the sample is located when the sample carrier carrying the sample is inserted into the receptacle is referred to as the "sample region" in the following. The sample region is adjacent to the upper side of the surface of the sample carrier. This can be a sub-surface of the upper side of the surface of the sample carrier. The hydrophilic region of the inventive sample carrier described below represents such a sub-surface.

The magnetic field region and the sample region may have the same form. However, the magnetic field region can comprise other portions of the receptacle, as long as it comprises the sample region when the sample carrier carrying a sample is inserted into the receptacle of the device according to the invention. If a sample carrier is not located in the receptacle, the magnetic field region is the portion of the receptacle in which the magnetic field apparatus is intended to produce a magnetic field, namely at least the portion of the receptacle in which the sample region is located when the sample carrier has been inserted into the receptacle, so that the magnetic field is formed on the upper side of the surface of the sample carrier. A portion of the receptacle is part of the inner space of the receptacle.

The magnetic field can be formed in the entire receptacle. The magnetic field region then corresponds to the inner space of the receptacle. However, it is possible for the magnetic field to only be formed in one or more portions of the receptacle. These portions then preferably comprise the portion of the receptacle that forms the sample region when the sample carrier is inserted into the receptacle. The magnetic field may not extend beyond the inner space of the receptacle. This can prevent the magnetic field acting on other components of the imaging apparatus or other components of a device or arrangement, for example a device or arrangement for examining biological samples. The device according to the invention may comprise shielding elements for limiting the magnetic field.

The device according to the invention is suitable in particular for examining biological and/or chemical samples containing magnetic particles. For this purpose, the biological and/or chemical samples can be bonded to the magnetic particles. Examples of such magnetic particles are so-called "magnetic beads" or ferrofluids. The biological samples can be subcellular components (for example nuclei), cells, cell complexes, tissue, cell colonies, cell cultures or combinations thereof, for example. The biological sample contains living cells, dead cells, separable cells, separable living cells, fixed cells, fixed dead cells or mixtures of these cells, for example. In the chemical field, magnetic particles can be used to enrich proteins and/or for DNA extraction, for example. In one embodiment, the sample is cells in a suspension, which adhere to the magnetic particles. Due to the action of the magnetic field, the cells then adhere to the upper side of the surface of the sample carrier by means of the magnetic particles. The device according to the invention is suitable for isolating cells consisting of immunomagnetic samples enriched with magnetic particles, for example.

When the sample carrier carrying the sample is inserted into the receptacle of the device according to the invention, the sample reaches the sample region of the receptacle. Due to the action of the magnetic field provided as per the invention, the magnetic particles and, together therewith, the biological and/or chemical sample containing the particles, are held in place, that is immobilized, on the sample carrier in the sample region as soon as the sample carrier is inserted into the device according to the invention. It has been found that temporary and reversible immobilization of the sample on the surface of the sample carrier can be achieved in this way, without permanently attaching the sample to the sample carrier.

The imaging system can be an imaging apparatus, for example a microscope or an optical scanning system. The imaging apparatus can comprise a transmitted light unit or a fluorescence unit. The microscope can be a transmitted light or reflected light microscope, for example. The microscope can be provided with a fluorescence unit. The imaging system can comprise an image data processing unit and an image storage unit. The temporary and reversible immobilization of the sample on the sample carrier, which is achieved using the device according to the invention, therefore prevents the sample and its components from moving, in particular shifting, on the sample carrier, even if the sample carrier is moved. The sample and the components thereof thus stay in the position they were in before the image was captured by the imaging unit, that is, before the scan process, for example. This ensures that the sample and its components are still in the same position even after the image has been captured.

The device according to the invention preferably comprises a main body, in the top of which a recess is made that forms the receptacle for the sample carrier. The recess should have a depth that is greater than the thickness of the sample carrier. This ensures that the magnetic field can act on a biological or chemical sample located on the sample carrier.

The receptacle for the sample carrier is advantageously configured such that the sample carrier is in a horizontal position when it is inserted into the device according to the invention. A "horizontal position" is understood to mean a position of the sample carrier in which its sides of the surface at least approximately lie in a horizontal plane.

The recess in the main body is preferably delimited by a bearing surface. The bearing surface should be spaced apart from the top and from the bottom of the main body. The sample carrier bears against the bearing surface when it is located in the recess. The bearing surface can comprise projections or depressions so that the sample carrier only bears against the bearing surface by part of its bottom side of the surface.

The recess can be of any shape, provided that it is dimensioned such that the sample carrier can be inserted therein. The recess can have a rectangular, circular or cross-shaped cross section. The recess can be substantially cylindrical, cube-shaped or cross-shaped, for example. The term "substantially" means that the shape does not have to be an ideal geometric shape, but may differ therefrom. A cube-shaped cavity is referred to as the "first cube-shaped cavity" in the following. In addition to the first cube-shaped cavity, the cross-shaped recess can comprise a second cube-shaped cavity, which crosses the first cube-shaped cavity. The second cube-shaped cavity preferably crosses the first cube-shaped cavity in the center with regard to the longitudinal axis thereof. The longitudinal axis of the first cube-shaped cavity preferably extends orthogonally to the longitudinal axis of the second cube-shaped cavity.

The width and length of the first cube-shaped cavity should be selected such that the sample carrier can be inserted into the first cube-shaped cavity. In this case, the first cube-shaped cavity can be of such a size that its walls rest against the edges of the sample carrier when the sample carrier is inserted into the first cube-shaped cavity. The second cube-shaped cavity makes it possible to easily introduce the sample carrier into the first cube-shaped cavity or to remove it therefrom. The portions of the second cube-shaped cavity that project over the first cube-shaped cavity in the region where they cross are preferably of such a size that they can be used as engaging portions.

The diameter of the cylindrical recess should be selected such that the sample carrier can be inserted into the cylindrical recess. In this case, the cylindrical recess can be of such a size that its wall rests against the edges of the sample carrier when the sample carrier is inserted into the cylindrical recess.

The device according to the invention can comprise one or more fixing elements, which make it possible to temporarily fix the sample carrier in the receptacle. These fixing elements can be formed in the recess. In one embodiment of the invention, fixing elements can be provided, which fix a sample carrier in the first cube-shaped cavity. For example, a fixing element can be formed on an end face of the first cube-shaped cavity, the fixing element pressing the sample carrier against the opposing end face of the first cube-shaped cavity. The fixing element(s) can be spring elements. The spring elements can be configured such that the spring has to be compressed by means of an external force when the sample carrier is intended to be inserted into the recess. If an external force is not exerted on the spring, the spring attempts to restore, thereby exerting force on the inserted sample carrier and thus fixing it in the recess. If the sample carrier is intended to be removed from the recess again, the spring has to be compressed by an external force again.

The device according to the invention can comprise guide elements, which are intended to make it easier to insert the device into an imaging system in a preset position, for example on a stage of the imaging apparatus or the xy stage described in connection with U.S. Pat. No. 9,822,331 B2. The guide elements can be pins, drilled holes, rail-like projections or inlets, for example, which are formed on the outer surface of the main body and can engage in corresponding guide elements formed on the imaging system.

The main body advantageously has a cube-shaped or at least approximately cube-shaped shape. The distance between the top and bottom of the main body is preferably smaller than the width or length of the top and bottom, that is, the side walls have a smaller height than the length and width of the top and the bottom. The main body is then plate-shaped. The recess that forms the receptacle for the sample carrier is located on the top of the main body. The recess extends from the top, towards the bottom, up to the bearing surface for the sample carrier. The bearing surface should be spaced apart from the bottom of the main body. The bearing surface delimits the inner space of the recess at the bottom. The recess is advantageously made at a spacing from the side walls of the main body. If the recess has a cross-shaped portion, the point where the longitudinal axes of the first cube-shaped cavity and the second cube-shaped cavity cross is preferably on an axis that extends through the center of the top and through the center of the bottom of the main body, that is, its longitudinal axis. If the recess of the device according to the invention is only in the form of a single cube-shaped cavity, that is, the first cube-shaped cavity, the center of the longitudinal axis of this first cube-shaped cavity advantageously lies on the longitudinal axis of the main body. The main body can be made of plastics material or of a different suitable material that should itself not be magnetic.

An opening can be made in the bottom of the main body, which extends up to the bearing surface. This opening can be slot-shaped, slit-shaped or circular. The opening allows light to pass from the bottom and top to the sample region. This is advantageous in particular for transmitted light microscopy and reflected light microscopy, with or without the use of fluorescence. The opening is therefore also referred to as the "light passage" in the following. The opening is open for the sample carrier on both the bottom of the main body and on the bearing surface.

The magnetic field apparatus is preferably arranged in the main body. The magnetic field apparatus can be one or more, preferably two, permanent magnets, one or more electromagnets or combinations thereof. The magnetic field apparatus is preferably arranged beneath the bearing surface in the main body. If the sample carrier is inserted into the device according to the invention, the magnetic field apparatus is located beneath the bottom side of the surface of the sample carrier. Permanent magnets and electromagnets are jointly referred to as "magnets" in the following. The magnetic field apparatus can comprise one, two or more magnets. If an electromagnet is provided, this electromagnet can be a controllable electromagnet.

The magnets are preferably arranged around the edge of the sample region. All or some of the magnets can be narrow magnets in the form of metal sheets. For inverted microscopes, the magnets can be arranged in a region of the main body that is adjacent to the top of the main body and is delimited at the bottom by the plane in which the sample carrier is located when it is inserted into the receptacle. This region is the upper region of the main body. In upright microscopes, the magnets can be arranged in the main body in a region that is adjacent to the bottom of the main body and is delimited at the top by the plane in which the sample carrier is located when it is inserted into the receptacle. This region is the bottom region of the main body.

It is advantageous for the magnetic field apparatus to ensure a planar formation of the magnetic field in the sample region. For this purpose, magnetic field conductors can be arranged in the main body, for example. The magnetic field conductors can redirect the magnetic field. The magnetic field conductors can be ferritic metal sheets, for example. The arrangement of the magnets should not lead to the magnetic particles being exposed to one-sided lateral forces. The magnetic particles are therefore intended to be prevented from enriching on one side of a phase boundary of the sample carrier or outside the observation region of the imaging apparatus. In one embodiment of the invention, a "planar formation" of the magnetic field is understood to mean a formation that extends beyond the upper side of the surface of the sample carrier, towards the surface normal of the sample carrier, but does not extend in this direction beyond the extent of a sample located on the sample carrier when the sample carrier is inserted into the device according to the invention. The apparatus for producing a magnetic field can therefore comprise magnetic field conductors. The magnetic field conductors preferably extend from a magnet and beneath one side of the surface of the sample carrier. The number of magnetic field conductors can correspond to the number of magnets.

Magnetic fields of different strengths and/or locations can be produced using the device according to the invention. This makes it possible to exert forces of different sizes on the magnetic particles. Magnetic fields of different strengths can be produced by changing the geometry of the magnets. If the device according to the invention comprises a magnetic field apparatus, the magnetic field strength of which can be changed, the magnetic field can be adapted to specific properties of the sample, specific requirements of the analysis method, or both. By adjusting the strength and/or location of the magnetic field, the position of the magnetic particles in the magnetic field can be influenced. For example, a centrically, rather single-sidedly, linear, punctiform arrangement or an arrangement in groups can be achieved.

The sample carrier can be of any shape as long as it has a surface on which a sample can be placed. This surface is preferably formed on one side of the surface of the sample carrier. The sample carrier can be a plate-shaped or disc-shaped body, such as a slide, or a shell-shaped body, such as a Petri dish, for example. The sample carrier can be made of glass or plastics material, for example. Sample carriers can be used, which are known in the art in connection with microscopy or other imaging apparatuses. However, other specially adapted sample carriers may also be used, even though this is not necessary.

According to the invention, a sample carrier is also provided, which is suitable in particular for insertion into the device according to the invention. The sample carrier comprises a surface side on which at least one hydrophilic region and at least one hydrophobic region is formed. This side of the surface of the sample carrier is the side on which the sample is placed. It is therefore also referred to as the "sample side of the surface" in the following. One or more hydrophilic regions may be surrounded by a hydrophobic region. Alternatively, one or more hydrophobic regions may be surrounded by a hydrophilic region. Likewise, the following can alternatively be provided: one or more hydrophilic regions, each hydrophilic region being surrounded by a separate hydrophobic region, or one or more hydrophobic regions, each hydrophobic region being surrounded by a separate hydrophilic region.

The sample side of the surface preferably comprises a coating of a hydrophobic material, which forms the hydrophobic region and surrounds the hydrophilic region. The hydrophobic material can be a plastics material, for example, having antistick properties, such as polytetrafluoroethylene (commercially available under the name "Teflon").

The hydrophilic region is preferably parallel to the longitudinal axis of the sample side of the surface, whereas the hydrophobic region is located at the edges of the sample side of the surface. The hydrophilic region does not have to extend over the entire length of the sample side of the surface. The hydrophilic region does not extend over the entire width of the sample side of the surface. The outer contour of the hydrophilic region is preferably entirely surrounded by the hydrophobic region on the sample side of the surface. The hydrophilic region is therefore only exposed at the top. If an aqueous sample is placed on the sample side of the surface of the sample carrier, the sample collects in the hydrophilic region of the sample carrier, but is pushed away from the hydrophobic edges. The sample is therefore defined on the sample carrier, more precisely the sample side of the surface. Since the hydrophilic region only takes up part of the sample side of the surface, the sample is therefore only located on a portion of the sample side of the surface. When the sample is placed on the sample side of the surface, it is concentrated on this portion. The sample region is therefore defined.

If the sample carrier according to the invention is inserted into the device according to the invention, the sample, which is located in the hydrophilic region of the sample side of the surface, therefore reaches the magnetic field region. Magnetic particles that are located in the sample are then held by the action of the magnetic field. In conjunction with the device according to the invention, the sample carriers according to the invention therefore allow for two-fold immobilization of the sample on the sample carrier according to the invention, specifically due to the interaction between the hydrophilic components of the sample and the hydrophilic region of the sample side of the surface of the sample carrier on the one hand, and, on the other hand, due to the action of the magnetic field on the magnetic particles in the sample. It is therefore sufficient for the magnetic field to act on a region that is adjacent to the hydrophilic region and extends upwards therefrom. This is the sample region. Therefore, the magnetic field region may only comprise the sample region, which is obtained when the sample carrier according to the invention is used. This sample region is small since it only starts from a portion of the sample side of the surface, that is, the hydrophilic region.

According to the invention, an arrangement is therefore provided, which comprises the device according to the invention and the sample carrier according to the invention. In this case, the magnetic field region is preferably limited to the sample region, which is determined by the hydrophilic region(s) of the sample side of the surface of the sample carrier.

According to the invention, a kit is also provided, which comprises the device according to the invention and one or more of the sample carriers according to the invention. In this case, the magnetic field region is preferably limited to the sample region that is determined by the hydrophilic region(s) of the sample side of the surface of the sample carrier.

According to the invention, an imaging system is also provided that comprises a receptacle for the device according to the invention. The receptacle of the imaging system can be the stage thereof, for example the xy stage described above in connection with U.S. Pat. No. 9,822,331 B2, or a stage that can move in the x, y and z direction, for example. This stage is referred to as the "x, y, z stage" in the following. The device according to the invention should be arranged in the receptacle of the imaging system according to the invention such that the sample region of the device according to the invention is located in the beam path of the imaging system. Fixing elements can be formed on the stage, the xy stage or the x, y, z stage for fixing the device according to the invention on the stage.

In accordance with the invention, an arrangement is provided, which comprises an imaging system according to the invention and a device according to the invention. This arrangement can also comprise a sample carrier according to the invention. In this case, the magnetic field region of the device according to the invention is preferably limited to the sample region, which is determined by the hydrophilic region(s) of the sample side of the surface of the sample carrier.

According to the invention, a kit is also provided, which comprises an imaging system according to the invention and a device according to the invention. The kit can also comprise one or more sample carriers according to the invention. In this case, the magnetic field region of the device according to the invention is preferably limited to the sample region that is determined by the hydrophilic region of the sample side of the surface of the sample carrier.

According to the invention, a method for viewing biological and/or chemical samples containing magnetic particles is lastly provided. The method comprises the steps of:
(a) placing the sample on a sample carrier;
(b) placing the sample carrier in the receptacle of a device according to the invention;
(c) inserting the device into the receptacle of an imaging system according to the invention; and
(d) analyzing the sample using the imaging system.

Step (b) can be carried out before step (a) such that the sample is only placed on the sample carrier after the sample carrier has already been inserted into the receptacle of the device according to the invention.

The sample carrier used in step (a) can be a sample carrier according to the invention, but does not have to be. Step (d) can include a bioanalytical and/or chemical evaluation of the sample. Alternatively or in addition, step (d) can also include removing components from the sample, for example cells. A picking tool can be used for this, for example the picking tool described in U.S. Pat. No. 9,822,331 B2.

In the simplest case, the analysis in step (d) can be the viewing of an image. However, the analysis in step (d) can also be a more complex process, for example the analysis can be an evaluation of the acquired image by means of image-analytical methods, a physical analysis or a chemical analysis. The physical analysis can, for example, be an analysis using fluorescence, and the chemical analysis can, for example, be an analysis using luminescence.

BRIEF DESCRIPTION OF THE DRAWINGS

The invention will now be described with reference to the drawings wherein.

FIGS. 4A and 4B show simplified section views through the embodiment of the device according to the invention, which is shown in FIG. 2 with the sample carrier inserted therein, wherein a sample is placed on the sample carrier (FIG. 4A: section along line A-A of FIG. 2; FIG. 4B: section along line B-B of FIG. 2);

DESCRIPTION OF THE PREFERRED EMBODIMENTS OF THE INVENTION

Figure 1:
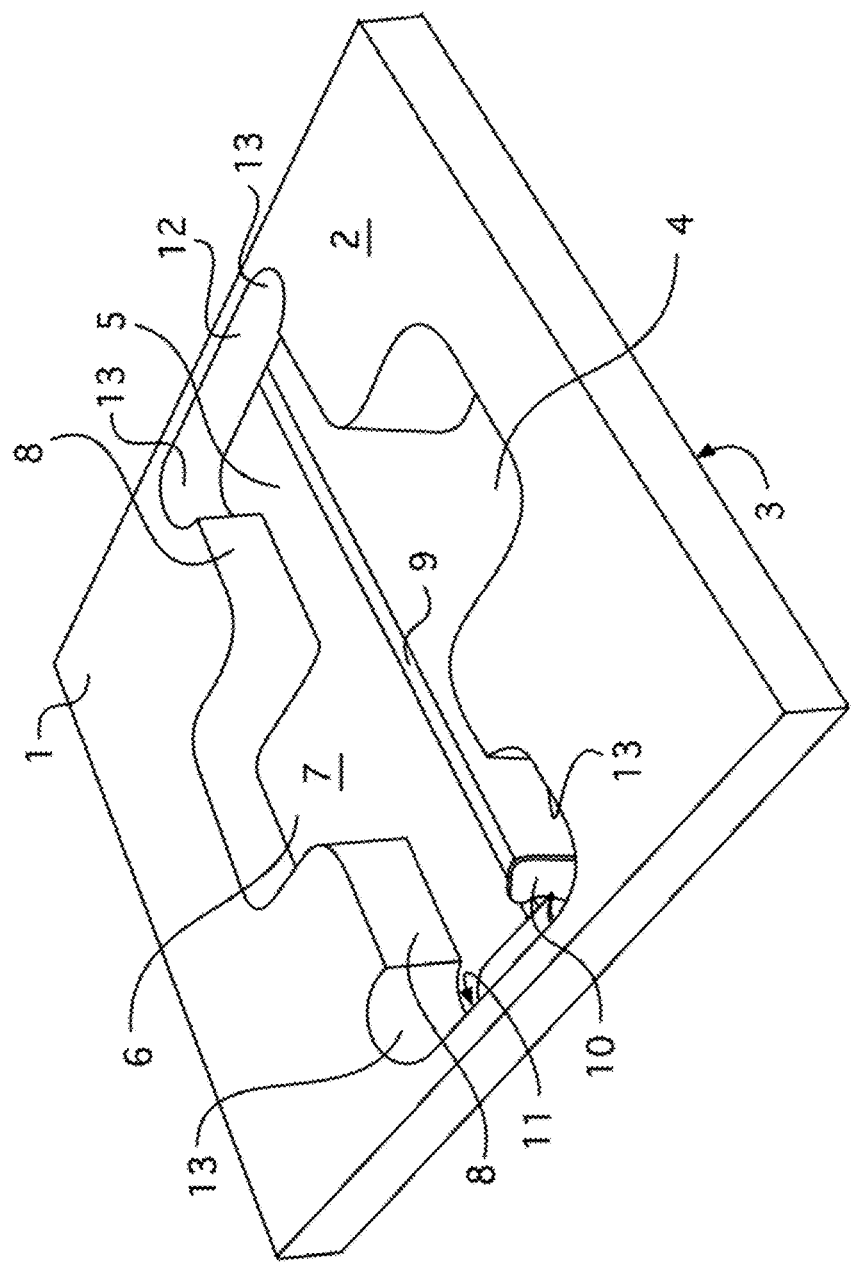
FIG. 1 is a schematic perspective view of an embodiment of the device according to the invention.

The embodiment of the device according to the invention shown in FIG. 1 comprises a cube-shaped, more precisely plate-shaped, main body 1, comprising a top 2 and a bottom 3. A recess 4 is made in the top and has a cross-shaped cross section having a first cube-shaped cavity 5 and a second cube-shaped cavity 6. Together, the first cube-shaped cavity 5 and the second cube-shaped cavity 6 form the recess 4.

The second cube-shaped cavity 6 extends orthogonally to the first cube-shaped cavity 5. In this case, the longitudinal axes of the first and second cube-shaped cavities 5, 6 intersect at their center. The recess 4 is limited at the bottom by the bearing surface 7. The width of the first cube-shaped cavity 5 is selected such that the longitudinal walls 8 of the first cube-shaped cavity 5, which delimit the first cube-shaped cavity 5, are adjacent to the longitudinal edges 105 of the sample carrier 101 when the sample carrier 101 is inserted into the recess 4 (see FIG. 2). The length of the first cube-shaped cavity is slightly greater than the length of the sample carrier 101 by a projection in order to allow the introduction and removal of the sample carrier. This projection is bridged by a spring element 10. The first cube-shaped cavity comprises widened portions 13 at the end faces 11, 12 of the first cube-shaped cavity 5 which end faces are formed by the transverse walls of the recess 4. The distance between the top 2 and the bottom 3 of the main body 1 is greater than the depth of the recess 4.

A slit-shaped light passage 9 is made in the bottom 3 of the main body 1. The light passage 9 extends from the bottom 3 up to the bearing surface 7. The light passage is open for the sample carrier on the bottom 3 of the main body and on the bearing surface 7. The opening extends in parallel with the longitudinal axis of the first cube-shaped cavity 5 and is spaced apart from the longitudinal walls 8 of the recess 4. In this case, it extends from the first end face 11 of the first cube-shaped cavity 5 up to the second end face 12 thereof.

The spring element 10, which is used as a fixing element and which, provided that external pressure, for example exerted by an operator, is not exerted on the spring element 10, presses the sample carrier 101 against the second end face 12 of the first cube-shaped cavity 5 by means of an end face 106, is located on the first end face 11.

Figure 2:
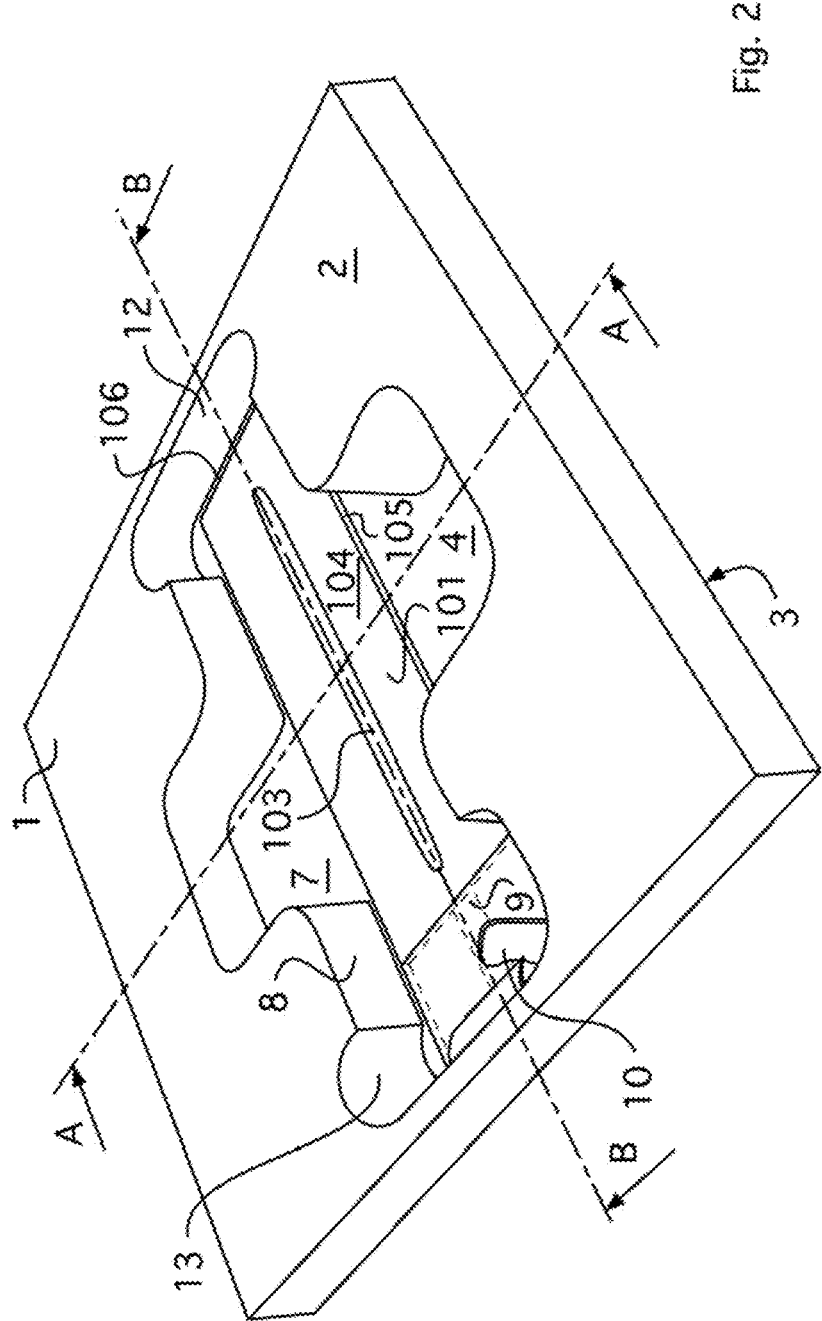
FIG. 2 is a schematic perspective view of the embodiment shown in FIG. 1 of the device according to the invention, in the recess of which an embodiment of a sample carrier according to the invention is inserted.
Figure 3:
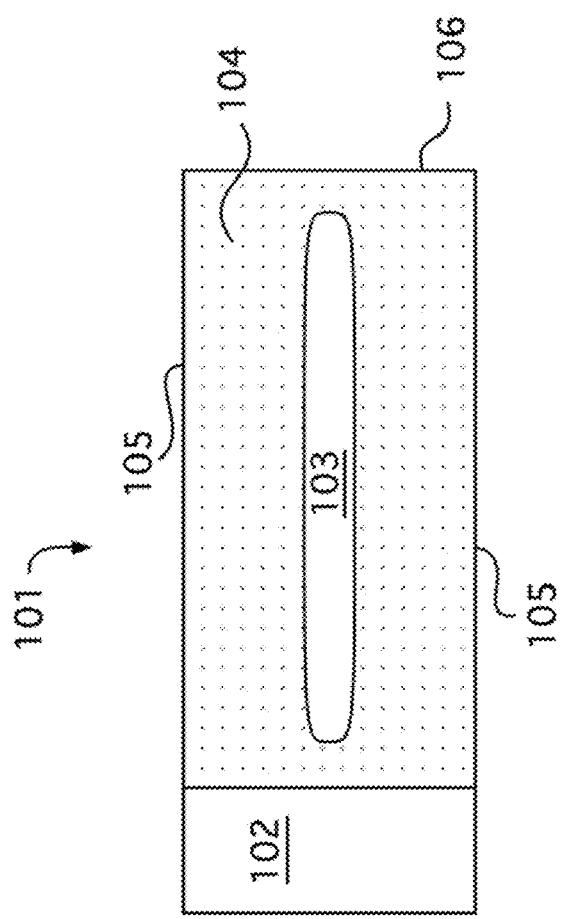
FIG. 3 is a schematic plan view of the embodiment already shown in FIG. 2 of a sample carrier according to the invention.

In FIG. 2, a sample carrier 101 is inserted into the recess 4 of the device according to the invention. The sample carrier 101 shown is a glass plate comprising a side of the surface 102, which comprises a coating of a hydrophobic material (FIG. 3). This coating produces a hydrophobic region 104 on the side of the surface. The hydrophobic region surrounds an elongate hydrophilic region 103, which is formed by the surface of the side of the surface 102. The longitudinal axis of the hydrophilic region 103 extends on the longitudinal axis of the side of the surface 102. The hydrophobic region 104 extends from the hydrophilic region, up to the longitudinal edges 105 and a transverse edge 106 of the side of the surface 102. Since the hydrophilic region 103 is at a smaller spacing from this transverse edge 106 than it is from the other transverse edge 106 of the side of the surface 102, the hydrophobic region does not extend as far as this other transverse edge 106 of the side of the surface 102 either. The sample is placed on the side of the surface 102. The side of the surface 102 is therefore the sample side of the surface.

Figure 4A:
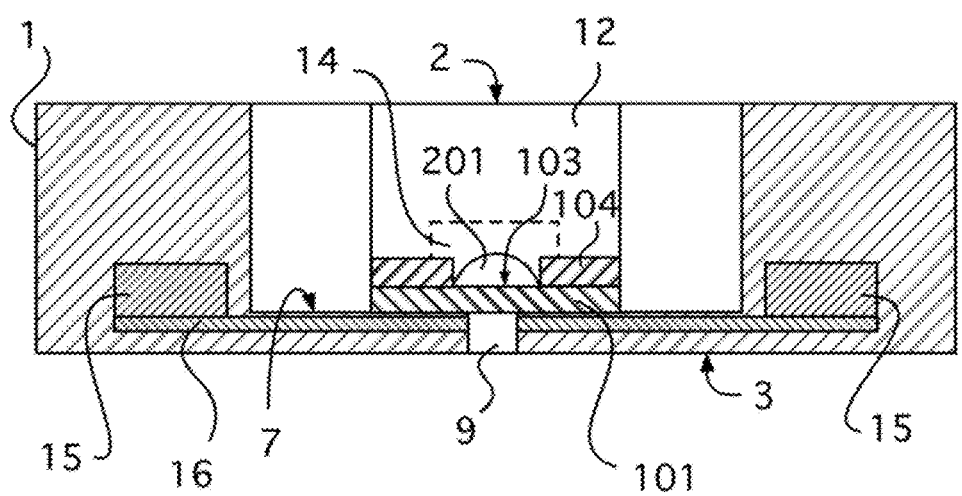

It can be seen in FIG. 2 that the sample carrier 101 rests on the bearing surface 7 in the recess 4 such that the sample carrier 101 lies in the recess 4 in a horizontal position. The sample side of the surface 102 is also in a horizontal position and faces away from the bearing surface. A sample 201 is therefore located in a portion of the inner space of the recess 4, which is located above the hydrophilic region 103 of the sample side of the surface 102 (see FIGS. 4A and 4B). This portion is the sample region. The sample region lies in the magnetic field region 14 (the region in FIGS. 4A and 4B surrounded by a dashed line), which is produced by a magnetic field apparatus arranged in the main body 1. The magnetic field apparatus consists of two magnets 15, which are arranged in the bottom region of the main body 1, namely between an end face of the second cube-shaped cavity 6 and the opposite side wall of the main body 1 in each case. Magnetic field conductors 16 are used to guide the magnetic field, which is generated by the magnets 15, beneath the sample carrier 101. For this purpose, the magnetic field conductors 16 each extend from a magnet 15 towards the light passage 9 on the bottom 3 of the main body.

It can be seen in FIG. 2 that the longitudinal axis of the hydrophilic region 103 extends in parallel with the light passage 9, namely in a plane that is perpendicular to the top 2 and the bottom 3 of the main body 1. It can also be seen in FIG. 2 that the recess 4 has a depth that is greater than the thickness of the sample carrier.

Figure 5:
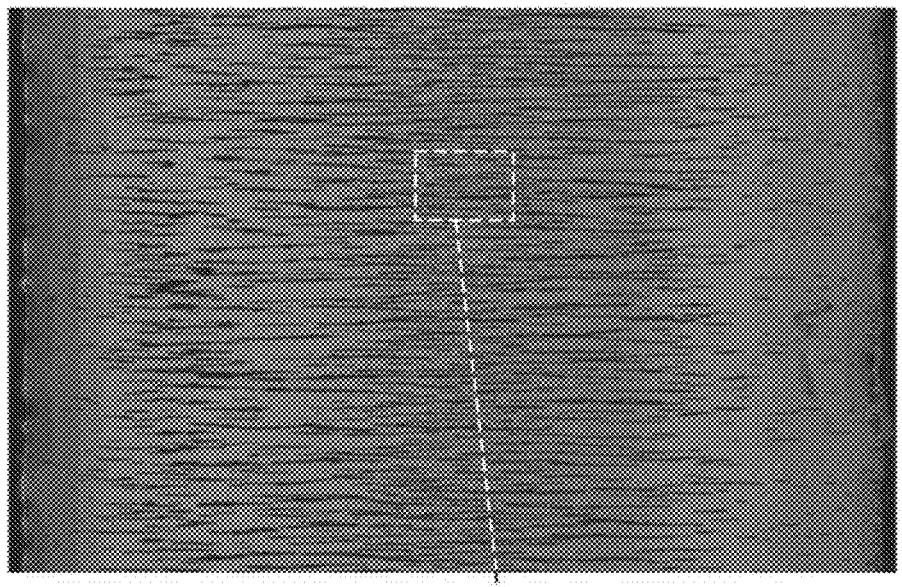
FIG. 5 is an enlarged view of a cut-out of a photographic image, which has been obtained with a microscope according to the invention; and, FIG. 6 is a cut-out of the cut-out shown in FIG. 5, which has been enlarged again.
Figure 6:
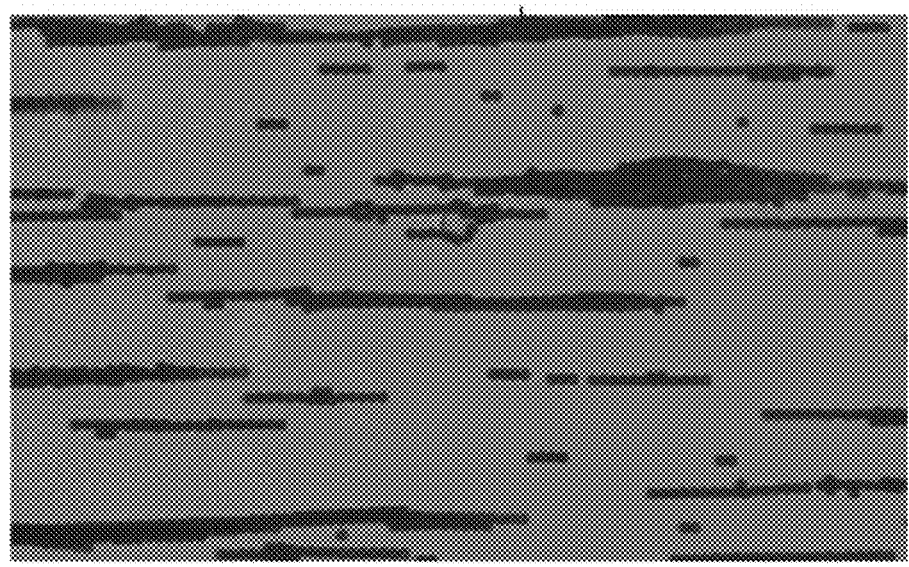

FIGS. 5 and 6 show enlarged cut-outs of an image of a sample that has been obtained using an imaging system. The sample was a cell culture of cells that adhered to magnetic particles and were suspended in an aqueous medium. The sample was placed on the sample carrier 101 shown in FIG. 3, the sample collecting in the hydrophilic region 103 of the sample side of the surface 102 of the sample carrier 101. The sample carrier 101 was inserted into the device shown in FIG. 1, as a result of which the arrangement shown in FIG. 2 was obtained. The device and sample carrier were then inserted into the corresponding receptacle of a microscope and an image was produced, with FIG. 5 showing an enlarged cut-out thereof and FIG. 6 showing a cut-out of the cut-out shown in FIG. 5, which has been enlarged once again. FIG. 5 shows the orientation of the magnetic particles in the magnetic field of the device. The immobilization and enrichment of the cells in the observation region that are bonded to the magnetic particles can be seen in FIG. 6.

It is understood that the foregoing description is that of the preferred embodiments of the invention and that various changes and modifications may be made thereto without departing from the spirit and scope of the invention as defined in the appended claims.

LIST OF REFERENCE NUMERALS 1 main body
2 top
3 bottom
4 recess
5 first cube-shaped recess or cavity
6 second cube-shaped recess or cavity
7 bearing or support surface
8 longitudinal wall
9 light passage opening
10 spring element
11 first end face
12 second end face
13 widened portion
14 magnetic field region
15 magnet
16 magnetic field conductor
101 sample or specimen carrier
102 sample or specimen side of the surface
103 hydrophilic region
104 hydrophobic region
105 longitudinal edge
106 transverse edge/end face
201 sample

What is claimed is:

1. A device for insertion into an imaging system, the device comprising:
a receptacle for accommodating a specimen carrier for a specimen therein;
an arrangement for generating a Magnetic field in a region of said receptacle;
a base body having an Upper side wherein a recess is formed defining said receptacle for said specimen carrier;
wherein said arrangement for generating a magnetic field is mounted in said base body;
said specimen carrier having a flat side;
said base body having a lower side;
said recess being delimited by a support surface for said specimen carrier;
said support surface being spaced from said lower side and said upper side of said base body;
said base body having an opening formed therein extending from said lower side to said support surface to permit light to pass therethrough;
said arrangement for generating a magnetic field including magnetic field conductors arranged below said flat side of said specimen carrier to Conduct and direct said magnetic field in a flattened formation in the region of the specimen and said opening; and,
said magnetic field conductors being arranged apart from said opening to allow light of said opening to pass said magnetic field conductors.

2. The device of claim 1, wherein said recess is formed to have one of the following cross sections: rectangular, circular or cross-shaped.

3. The device of claim 1, further comprising guide elements formed on said base body at a predetermined position to facilitate insertion of said device into said imaging system.

4. The device of claim 1, wherein said recess has an essentially cross-shaped cross section and has a first cube-shaped cavity and a second cube-shaped cavity orthogonally crossing said first cube-shaped cavity; and, said first cube-shaped cavity has a width and length selected so as to permit said specimen carrier to be placed therein.

5. The device of claim 4, wherein said first cube-shape cavity defines first and second longitudinal walls and said specimen carrier defines first and second longitudinal edges; and, said width of said first cube-shaped cavity is so dimensioned that said first and second longitudinal walls lie against corresponding ones of said first and second longitudinal edges when said specimen carrier is placed in said first cube-shaped cavity.

6. The device of claim 1, further comprising a fixative element for fixing said specimen carrier in said receptacle.

7. The device of claim 1, wherein said arrangement for generating a magnetic field includes one of the following: one or several permanent magnets, one or several electromagnets or includes a combination of one or several permanent magnets and one or several electromagnets.

8. The device of claim 1, wherein said magnetic field conductors are configured to ensure that the magnetic field assumes a planar formation in said region of the specimen.

9. A method for analyzing a biological specimen and/or chemical specimen containing magnetic particles, said method comprising the steps of:
applying the specimen to a light conducting specimen carrier;
placing the specimen carrier in a receptacle of a device for insertion into an imaging system, the device including an opening formed therein located be low said specimen carrier to permit light to pass therethrough and said device further including an arrangement for generating a magnetic field in a region of said opening and said device further including at least one magnetic field conductor to conduct and direct the magnetic field in a flattened formation to the region of said specimen with said magnetic field conductor being configured to delimit a path allowing said light of said opening to pass said magnetic field conductors unobstructed;
inserting said device into a receptacle of an imaging system; and,
analyzing the specimen while utilizing the imaging system.

10. The method of claim 9, wherein said at least one magnetic field conductor is arranged in the receptacle at a location whereat said magnetic field conductor lies below the specimen carrier when the specimen carrier is inserted in the receptacle.

11. An assembly for insertion into an imaging system, the assembly comprising:
a light conducting specimen carrier in a flat side having at least one hydrophilic region and at least one hydrophobic region;
a receptacle for accommodating said specimen carrier therein;
said receptacle including a base body defining an upper side wherein a recess is formed for receiving said specimen carrier therein;
said receptacle having a light passage formed in said base body disposed beneath said specimen carrier;
at least one magnetic element to provide a magnetic field in a specimen region when said specimen carrier is in said recess;
at least one magnetic field conductor arranged beneath said specimen carrier and communicating magnetically with said at least one magnetic element to guide said magnetic field in a flattened formation it said specimen region; and, said at least one magnetic field conductor being configured not to overlap said light passage so as not to obstruct light passing through said light passage to or from said specimen region.

12. The assembly of claim 11, wherein said hydrophilic region of said specimen Cartier defines said specimen region; and, said at least one magnetic element and said at least one magnetic field conductor are arranged so as to limit said magnetic field to said specimen region.

13. The assembly of claim 12, wherein said at least one magnetic element is mounted in said base body adjacent recess and said at least one magnetic field conductor is mounted in said base body beneath a flat side of said specimen carrier.

14. The assembly of claim 13, wherein said magnetic field has a planar formation in said specimen region.

15. The assembly of claim 11, further comprising a coating on said flat side of a hydrophobic material defining said hydrophobic region.

16. The assembly of claim 12, further comprising a coating on said flat side of a hydrophobic material defining said hydrophobic region.

\* \* \* \* \*

UNITED STATES PATENT AND TRADEMARK OFFICE
CERTIFICATE OF CORRECTION

PATENT NO. : 11,266,991 B2
APPLICATION NO. : 16/132443
DATED : March 8, 2022
INVENTOR(S) : G. Bornmann et al.

It is certified that error appears in the above-identified patent and that said Letters Patent is hereby corrected as shown below:

In the Claims

Column 11:
Line 34: in Claim 1, delete "Magnetic" and substitute -- magnetic -- therefor.
Line 36: in Claim 1, delete "Upper" and substitute -- upper -- therefor.
Line 52: in Claim 1, delete "Conduct" and substitute -- conduct -- therefor.

Column 12:
Line 4: in Claim 5, delete "cube-shape" and substitute -- cube-shaped -- therefor.
Line 50: in Claim 11, delete "in" and substitute -- including -- therefor.

Column 13:
Line 6: in Claim 12, delete "Cartier" and substitute -- carrier -- therefor.

Signed and Sealed this
Twentieth Day of September, 2022

Katherine Kelly Vidal
Director of the United States Patent and Trademark Office